(12) United States Patent
Cui et al.

(10) Patent No.: US 12,472,874 B2
(45) Date of Patent: Nov. 18, 2025

(54) HINGED ENGINEERING MACHINERY, PANORAMIC SURROUND-VIEW SYSTEM AND CALIBRATION METHOD THEREOF

(71) Applicant: XCMG CONSTRUCTION MACHINERY CO., LTD. ROAD MACHINERY BRANCH, Jiangsu (CN)

(72) Inventors: Jisheng Cui, Jiangsu (CN); Bowen Wu, Jiangsu (CN); Kun Zhuang, Jiangsu (CN); Tianjiao Zhang, Jiangsu (CN); Lige Xue, Jiangsu (CN)

(73) Assignee: XCMG CONSTRUCTION MACHINERY CO., LTD. ROAD MACHINERY BRANCH, Jiangsu (CN)

( * ) Notice: Subject to any disclaimer, the term of this patent is extended or adjusted under 35 U.S.C. 154(b) by 292 days.

(21) Appl. No.: 18/025,731

(22) PCT Filed: Nov. 19, 2020

(86) PCT No.: PCT/CN2020/130042
§ 371 (c)(1),
(2) Date: Mar. 10, 2023

(87) PCT Pub. No.: WO2022/057077
PCT Pub. Date: Mar. 24, 2022

(65) Prior Publication Data
US 2023/0347827 A1 Nov. 2, 2023

(30) Foreign Application Priority Data
Sep. 15, 2020 (CN) .......................... 202010967431.0

(51) Int. Cl.
*B60R 1/27* (2022.01)
*E01C 19/00* (2006.01)
(Continued)

(52) U.S. Cl.
CPC .............. *B60R 1/27* (2022.01); *E01C 19/004* (2013.01); *G06T 5/80* (2024.01); *G06T 7/80* (2017.01);
(Continued)

(58) Field of Classification Search
CPC ................ B60R 1/23; B60R 2300/303; B60R 2300/602; B60R 1/27; B60R 2300/105;
(Continued)

(56) References Cited

U.S. PATENT DOCUMENTS

| 2014/0088824 A1* | 3/2014 | Ishimoto | ............... E02F 9/0841 348/148 |
| 2016/0212352 A1* | 7/2016 | Sanchez | ................. H04N 5/265 |

(Continued)

FOREIGN PATENT DOCUMENTS

| CN | 202323647 U | 7/2012 |
| CN | 103985118 A | 8/2014 |

(Continued)

OTHER PUBLICATIONS

International Search Report for PCT Application No. PCT/CN2020/130042 mailed Jun. 16, 2021 (5 Pages).
(Continued)

*Primary Examiner* — Abby Lin
(74) *Attorney, Agent, or Firm* — Merchant & Gould P.C.

(57) ABSTRACT

The present disclosure relates to hinged engineering machinery, a panoramic surround-view system and a calibration method thereof. The hinged engineering machinery comprises at least two hinged structure segments sequentially connected by means of a hinged frame, wherein the at least two hinged structure segments comprise a first hinged structure segment, the first hinged structure segment comprising a first vehicle body and a cab arranged on the first vehicle body. The panoramic surround-view system com-
(Continued)

prises: a plurality of photographing devices, mounted on the first hinged structure segment and configured to photograph the environment around the hinged engineering machinery; an image processing device, configured to receive images photographed by the plurality of photographing devices and splice the images into a surround-view image around the entire first hinged structure segment; and a human-computer interaction component, configured to display the surround-view image spliced by the image processing device.

22 Claims, 6 Drawing Sheets

(51) Int. Cl.
| | | |
|---|---|---|
| *E01C 19/26* | (2006.01) | |
| *G06T 5/80* | (2024.01) | |
| *G06T 7/80* | (2017.01) | |
| *G06V 10/44* | (2022.01) | |
| *H04N 5/262* | (2006.01) | |
| *H04N 7/18* | (2006.01) | |
| *H04N 17/00* | (2006.01) | |
| *H04N 23/698* | (2023.01) | |
| *H04N 23/90* | (2023.01) | |

(52) U.S. Cl.
CPC ........... *G06V 10/44* (2022.01); *H04N 5/2628* (2013.01); *H04N 7/181* (2013.01); *H04N 17/002* (2013.01); *H04N 23/698* (2023.01); *H04N 23/90* (2023.01); *B60R 2300/105* (2013.01); *B60R 2300/303* (2013.01); *B60R 2300/80* (2013.01); *E01C 19/26* (2013.01)

(58) Field of Classification Search
CPC .......... B60R 2300/80; B60R 2300/102; B60R 2300/20; B60R 2300/402; B60R 2300/802; B60R 11/04; G06T 3/00; G06T 5/80; G06T 7/80; H04N 23/69; H04N 5/265; H04N 5/2628; H04N 7/181; H04N 17/002; H04N 23/698; H04N 23/90; E01C 19/004; E01C 19/26; E01C 19/23; E01C 2301/30; G06V 10/44; B60W 30/18; B60W 40/02; B60W 50/14; B60W 2050/146

See application file for complete search history.

(56) References Cited

U.S. PATENT DOCUMENTS

| | | | | |
|---|---|---|---|---|
| 2017/0277961 | A1* | 9/2017 | Kuehnle | ................ H04N 23/90 |
| 2018/0063446 | A1* | 3/2018 | Ali | ......................... H04N 5/265 |

FOREIGN PATENT DOCUMENTS

| | | |
|---|---|---|
| CN | 104090366 A | 10/2014 |
| CN | 105205785 A | 12/2015 |
| CN | 108198133 A | 6/2018 |
| CN | 108263283 A | 7/2018 |
| CN | 109089086 A | 12/2018 |
| CN | 109435852 A | 3/2019 |
| CN | 110363085 A | 10/2019 |
| CN | 110983914 A | 4/2020 |
| CN | 111080717 A | 4/2020 |
| CN | 111931705 A | 11/2020 |
| CN | 111942391 A | 11/2020 |
| CN | 212289808 U | 1/2021 |
| CN | 212302504 U | 1/2021 |

OTHER PUBLICATIONS

First Office Action issued on Jul. 7, 2023 of the Chinese Priority Application No. 2020010967431.0 (14 pages).
Office Action dated 21.02.2025 for corresponding DE Application No. 11 2020 007 380.7 (9 pages including English Translation).

* cited by examiner

HINGED ENGINEERING MACHINERY, PANORAMIC SURROUND-VIEW SYSTEM AND CALIBRATION METHOD THEREOF

This application is a National Stage Application of International Application No. PCT/CN2020/130042, filed 19 Nov. 2020, which claims benefit of Ser. No. 202010967431.0, filed 15 Sep. 2020 in China, and which applications are incorporated herein by reference. To the extent appropriate, a claim of priority is made to each of the above disclosed applications.

CROSS-REFERENCE TO RELATED APPLICATION

The present disclosure is based on and claims priority to Chinese Patent Application 202010967431.0, filed on Sep. 15, 2020, the disclosure of which is hereby incorporated to the present disclosure in its entirety.

TECHNICAL FIELD

The present disclosure relates to the field of engineering machinery driving assistance, in particular to hinged engineering machinery, a panoramic surround-view system and a calibration method thereof.

BACKGROUND

The development of modern science and technology has greatly promoted the intelligence of engineering machinery, and more and more high-end technology has been introduced into the field of engineering machinery, resulting in a continuous progress of engineering machinery toward the goal of being more efficient and safer. Usually, most engineering machinery in a construction process can only rely on a rear-view mirror or a reversing image to assist in observing the surrounding environment. However, as there are shielding objects such as a vehicle head, windows and pillars, and a cab of the engineering machinery is generally high and provides a limited field of view, a driver's field of view has blind areas, such that he cannot determine whether there is an obstacle in a shielded area and a distance from the obstacle.

Moreover, in order to improve the flexibility of steering and operation of engineering machinery, there has emerged engineering machinery in which a cab is connected to a rear frame by means of a hinged mechanism. During steering of the engineering machinery, the angle of the rear frame relative to the cab is constantly changing, so it is more difficult for a driver to make judgment on the environment around the engineering machinery, which increases the difficulty of operation and makes it difficult to ensure safety during driving.

SUMMARY

According to a first aspect of the present disclosure, there is provided a panoramic surround-view system of the hinged engineering machinery, the hinged engineering machinery including at least two hinged structure segments connected sequentially by means of a hinged frame, the at least two hinged structure segments including a first hinged structure segment, the first hinged structure segment including a first vehicle body and a cab arranged on the first vehicle body, the panoramic surround-view system including:

a plurality of photographing devices, mounted on the first hinged structure segment and configured to photograph the environment around the hinged engineering machinery;

an image processing device, configured to receive images photographed by the plurality of photographing devices and splice the images into a surround-view image around the entire first hinged structure segment; and a human-computer interaction component, configured to display the surround-view image spliced by the image processing device.

In some embodiments, the plurality of photographing devices are all located on a same side of the same hinged frame in a length direction of the hinged engineering machinery.

In some embodiments, the at least two hinged structure segments further include: a second hinged structure segment and a third hinged structure segment connected to two sides of the first hinged structure segment, respectively, and the plurality of photographing devices are all located between two hinged frames connected to the first hinged structure segment.

In some embodiments, the plurality of photographing devices are arranged around an outer periphery of the cab or around an outer periphery of the first hinged structure segment.

In some embodiments, if a length of the first hinged structure segment is less than an effective identification range of a single photographing device, the plurality of photographing devices include four photographing devices arranged in a front part, in a rear part, at a left side and at a right side of the first hinged structure segment, respectively; and/or if a length of the first hinged structure segment is not less than the effective identification range of a single photographing device, the plurality of photographing devices include at least six photographing devices, one photographing device being arranged in the front part and one photographing device being arranged in the rear part of the first hinged structure segment, and at least two photographing devices being arranged spaced apart at the left side and at least two photographing devices being arranged spaced apart at the right side of the first hinged structure segment.

In some embodiments, the plurality of photographing devices are arranged at the top of the first hinged structure segment, and photographing surfaces of the photographing devices face the outer side of the first hinged structure segment and are obliquely downward.

In some embodiments, the panoramic surround-view system further includes:

a traveling controller electrically, connected to the image processing device, and configured to control a traveling direction and a traveling speed of the hinged engineering machinery and transmit information of the traveling direction and the traveling speed to the image processing device, wherein the image processing device is configured to move up and down the surround-view image displayed in the human-computer interaction component, according to the traveling direction, specifically moving the surround-view image down when the traveling direction is forward and moving the surround-view image up when the traveling direction is backward, and to determine how fast the surround-view image is moved and a position where the image finally stops, according to the traveling speed.

In some embodiments, the panoramic surround-view system further includes a plurality of calibration devices arranged on a preset reference plane outside the first hinged structure segment and arranged around the outer periphery of the cab or the first hinged structure segment, respective top surfaces of the plurality of calibration devices being lower than mounting heights of the photographing devices at corresponding positions, and the plurality of calibration devices being configured to calibrate photographed images before the plurality of photographing devices are formally used.

In some embodiments, the human-computer interaction component is configured to receive from an operator a calibration instruction to move a calibration cursor to feature identification objects in the calibration devices, and transmit the calibration instruction to the image processing device; and the image processing device is configured to receive the calibration instruction and correct distortions in images photographed by the plurality of photographing devices according to actual parameters of the plurality of calibration devices.

In some embodiments, the actual parameters of the plurality of calibration devices include a distance between two adjacent calibration devices and outer contour dimensions of the feature identification object in a single calibration device, the feature identification object being configured for the operator to perform calibration in the human-computer interaction component by means of the calibration cursor.

In some embodiments, the plurality of calibration devices are arranged outside the preset reference boundary, the preset reference boundary being at a preset distance deviated outward overall relative to a rectangular area formed by an outer contour of the cab or the first hinged structure segment.

In conjunction with display of the human-computer interaction component, photographing angles of the plurality of photographing devices are configured to be adjusted to be able to photograph the range from the vehicle body of the hinged engineering machinery to the preset reference boundary.

In some embodiments, the plurality of calibration devices are arranged outside the preset reference boundary, the preset reference boundary being at a preset distance deviated outward overall relative to an area where an outer contour of the cab is located; and
  if a length of the first hinged structure segment is less than the effective identification range of a single photographing device, the plurality of calibration devices are arranged at four corners of the preset reference boundary, respectively; or
  if a length of the first hinged structure segment is not less than the effective identification range of a single photographing device, the calibration devices are arranged at four corners of the preset reference boundary and at positions on left and right sides thereof located between two adjacent photographing devices, respectively.

In some embodiments, the heights of the calibration devices are adjustable.

In some embodiments, the human-computer interaction component is configured to receive externally input image revision parameters of at least some photographing devices of the plurality of photographing devices to ensure the surround-view image is at the same height.

In some embodiments, the calibration device includes:
  a base;
  a first support frame, a first end of the first support frame being fixed to the base;
  a second support frame, located above the first support frame, a first end of the second support frame being connected to a second end of the first support frame and the height of the second support frame being adjustable; and
  a framework, connected to a second end of the second support frame, the framework serving as a feature identification object when an operator performs calibration in the human-computer interaction component.

According to a second aspect of the present disclosure, there is provided hinged engineering machinery including: at least two hinged structure segments connected sequentially by means of a hinged frame, and a panoramic surround-view system of the hinged engineering machinery of the above embodiments,
  wherein the at least two hinged segments include a first hinged structure segment, the first hinged structure segment including a first vehicle body and a cab arranged on the first vehicle body.

According to a third aspect of the present disclosure, there is provided a calibration method based on the panoramic surround-view system of the hinged engineering machinery of the above embodiment, the method including:
  in conjunction with display of the human-computer interaction component, adjusting photographing angles of the plurality of photographing devices to be able to photograph the range from the vehicle body of the hinged engineering machinery to a preset reference boundary, the preset reference boundary being at a preset distance deviated outward overall relative to an area where an outer contour of the cab or the first hinged structure segment is located;
  arranging a plurality of calibration devices on a reference plane around the outside of the preset reference boundary; and
  moving a calibration cursor in the human-computer interaction component to feature identification objects of the calibration devices to calibrate photographed images before the plurality of photograph components are formally used.

In some embodiments, the calibration method further includes:
  after the surround-view image is formed by splicing, according to height matching degrees of partial images of the surround-view image, setting image revision parameters of at least some photographing devices of the plurality of photographing devices by means of the human-computer interaction component, to ensure the surround-view image is at the same height.

In some embodiments, arranging the plurality of calibration devices on the reference plane outside the preset reference boundary includes:
  obtaining an overall top-view model of the hinged engineering machinery;
  in the overall top-view model, only retaining a part of the model in the area where the outer contour of the cab or the first hinged structure segment is located;
  finding, in the actual vehicle body, an actual area corresponding to the part of the model, and marking the reference boundary on the reference plane at a preset distance deviated outward relative to the actual area; and
  arranging, on the reference plane, the plurality of calibration devices around the outside of the preset reference boundary.

In some embodiments, before calibrating the photographed images, the calibration method further includes:

inputting actual parameters of the plurality of calibration devices by means of the human-computer interaction component, for use in correcting, by the image processing device, distortions in the images photographed by the plurality of photographing devices to achieve calibration, wherein the actual parameters of the plurality of calibration devices include a distance between two adjacent calibration devices and outer contour dimensions of the feature identification object in a single calibration device, the feature identification object being configured for the operator to perform calibration in the human-computer interaction component.

In some embodiments, after arranging the plurality of calibration devices on the reference plane outside the preset reference boundary, the calibration method further includes:

adjusting the heights of the plurality of calibration devices, so as to adjust a proportion of the vehicle body of the hinged engineering machinery in the surround-view image after calibration.

In some embodiments, the plurality of photographing devices include at least four photographing devices, one photographing device being arranged in the front part and one photographing device being arranged in the rear part of the first hinged structure segment, at least one photographing device being arranged at the left side and at least one photographing device being arranged at the right side of the first hinged structure segment, one calibration device being arranged at each of four corners of the preset reference boundary, respectively, wherein the at least two hinged structure segments further include a second hinged structure segment, the first hinged structure segment being connected to the second hinged structure segment and located at a rearmost end, and adjusting the heights of the plurality of calibration devices includes:

adjusting the heights of the calibration devices at left front and right front positions to a height close to that of the second hinged structure segment altitude, and lower than a mounting height of the photographing device in the front part; and adjusting the heights of the calibration devices at left rear and right rear positions to a height lower than a mounting height of the photographing device in the rear part, and with a height difference from the calibration devices at the left front and right front positions not exceeding a preset height; or the at least two hinged structure segments further include a second hinged structure segment, the first hinged structure segment being connected to the second hinged structure segment and located at a foremost end, and adjusting the heights of the plurality of calibration devices includes:

adjusting the heights of the calibration devices at left front and right front positions to a height close to the second hinged structure segment altitude, and lower than a mounting height of the photographing device in the front part; and adjusting the heights of the calibration devices at left front and right front positions to a height lower than a mounting height of the photographing device in the front part, and with a height difference from the calibration devices at the left rear and right rear positions not exceeding a preset height; or the at least two hinged structure segments further include a second hinged structure segment and a third hinged structure segment connected to a front side and a rear side of the first hinged structure segment, respectively, and adjusting the heights of the plurality of calibration devices includes:

adjusting the heights of the calibration devices at left front and right front positions to a height close to the second hinged structure segment, and lower than a mounting height of the photographing device in the front part; and adjusting the heights of the calibration devices at left rear and right rear positions to a height close to the third hinged structure segment, and lower than a mounting height of the photographing device in the rear part.

In some embodiments, at least two photographing devices are arranged spaced apart at the left side and at least two photographing devices are arranged spaced apart at the right side of the first hinged structure segment, and at least one calibration device is arranged at a left middle position and at least one calibration device is arranged at a right middle position of the preset reference boundary, the calibration device being located between two adjacent photographing devices on the same side, and after adjusting the calibration devices at the four corners of the preset reference boundary, adjusting the heights of the plurality of calibration devices further includes:

adjusting the height of the calibration device at the left middle position to a height between the heights of the calibration devices at the four corners, and lower than mounting heights of the at least two photographing devices at the left side; and adjusting the height of the calibration device at the right middle position to a height between the heights of the calibration devices at the four corners, and lower than mounting heights of the at least two photographing devices at the right side.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings.

Figure 1:
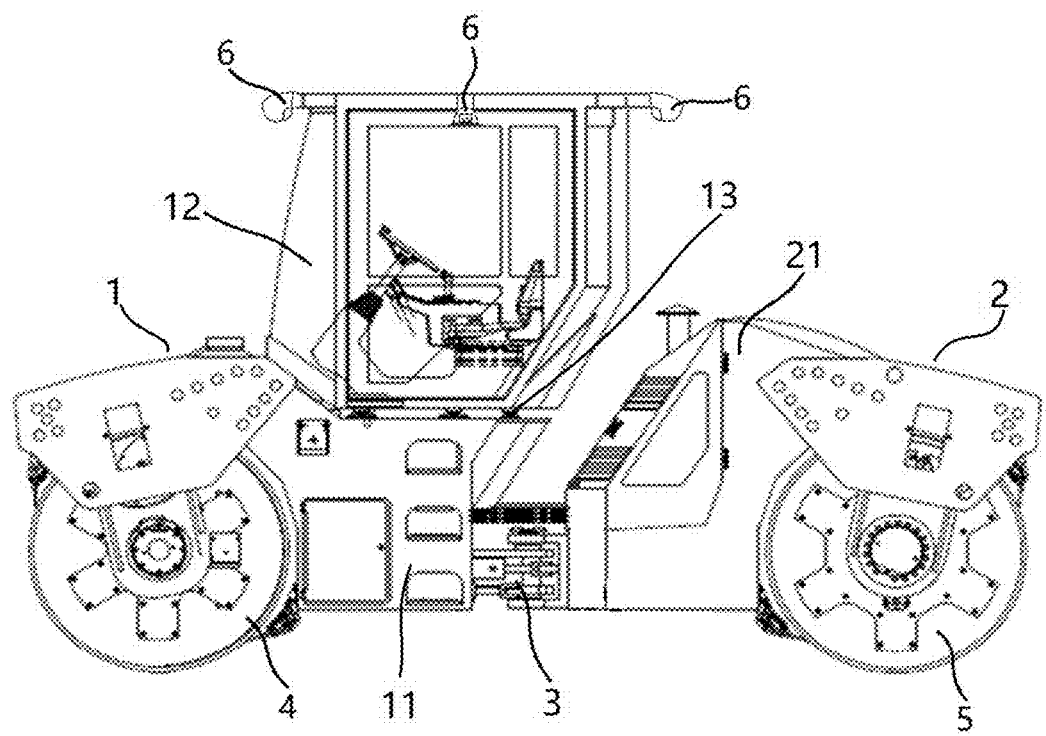
FIG. 1 is a side view of a first embodiment of hinged engineering machinery of the present disclosure.

REFERENCE NUMERALS 1, first hinged structure segment; 11, first vehicle body; 12, cab; 13, elastic coupling; 2, second hinged structure segment; 2', third hinged structure segment; 21, second vehicle body; 3, hinged frame; 4, front wheel; 5, rear wheel; 6, photographing device; 7, calibration device; 71, base; 711, cross beam; 72, first support frame; 73, second support frame; 74, framework; 741, beam; 742, reinforcing beam; X, calibration cursor; 8, image processing device; 9, human-computer interaction component; 10, traveling controller.

DETAILED DESCRIPTION

This present disclosure is described in detail below. In the following paragraphs, different aspects of the embodiments are defined in more detail. The aspects so defined may be combined with any other aspect or aspects, unless stated expressly to the contrary. In particular, any feature considered to be preferred or advantageous may be combined with one or more other features considered to be preferred or advantageous.

The terms "first", "second" and the like appearing in the present disclosure are only for convenience of description to distinguish different components with the same name, and do not indicate a precedence or primary-secondary relationship.

In description of the present disclosure, orientation or location relations denoted by the terms "upper", "lower", "left", "right", "front", "rear", "inner" and "outer" are adopted, which are defined based on an orientation in which an operator sits in a cab, and are only for the convenience of describing the present disclosure, rather than indicating or implying that the denoted devices necessarily have specific orientations and are constructed and operated in specific orientations, and thus should not be construed as limiting the protection scope of the present disclosure.

Embodiments of the present disclosure provide hinged engineering machinery, a panoramic surround-view system and a calibration method thereof, which can improve the safety of engineering machinery during driving.

In the panoramic surround-view system of the hinged engineering machinery in embodiments of the present disclosure, a plurality of photographing devices are all mounted on a first hinged structure segment, so that when a second hinged structure segment swings relative to the first hinged structure segment including a cab during traveling of the engineering machinery, the photographing devices can also clearly photograph a positional change of the second hinged structure segment and conditions outside the cab, making image splicing easier, which can optimize an image splicing effect and prevent the occurrence of a visual blind area; moreover, there is no need to install an angle sensor for detecting a swing angle of a vehicle body structure to achieve image splicing, so the panoramic surround-view system is simpler in structure and easy to implement.

As shown in FIGS. 1 to 8, the present disclosure provides a panoramic surround-view system of the hinged engineering machinery. In some embodiments, the hinged engineering machinery includes at least two hinged structure segments connected by means of a hinged frame 3. The at least two hinged structure segments include a first hinged structure segment 1. The first hinged structure segment 1 includes a first vehicle body 11 and a cab 12 arranged on the first vehicle body 11. The cab 12 can be mounted on the first vehicle body 11 by means of an elastic coupling 13. The engineering machinery may only include two hinged structure segments, for example in the case of a loader, a road grader, a mining haul truck or a mining truck. Alternatively, the engineering machinery may also include three hinged structure segments, for example in the case of a hot air heating vehicle or an infrared heating vehicle.

When the engineering machinery travels, the other hinged structure segment(s) may swing in a horizontal plane relative to the first hinged structure segment 1 where the cab 12 is located. If the first hinged structure segment 1 is located at a front end, the hinged structure segment(s) behind it may swing in the horizontal plane relative to the first hinged structure segment 1 during traveling of the engineering machinery; or the first hinged structure segment 1 may also be located at a rear end, and the hinged structure segment(s) in front of it may swing in the horizontal plane relative to the first hinged structure segment 1; or the first hinged structure segment 1 may also be located in a middle position, and both the hinged structure segments in front of and behind it may swing in the horizontal plane relative to the first hinged structure segment 1.

The panoramic surround-view system may include: a plurality of photographing devices 6, an image processing device 8 and a human-computer interaction component 9.

The plurality of photographing devices 6 are mounted on the first hinged structure segment 1. For example, the plurality of photographing devices 6 may all be mounted on the cab 12, or to both the cab 12 and the first vehicle body 11. The plurality of photographing devices 6 are configured to photograph the environment around the hinged engineering machinery, including the vehicle body, ground and surrounding conditions. For example, the photographing devices 6 may be mounted on the outer side of the cab 12 or the first vehicle body 11. The photographing devices 6 may be cameras, such as a panoramic cameras, wide-angle cameras or fisheye cameras.

The image processing device 8 is electrically connected to the plurality of photographing devices 6, and is configured to receive images, which may be pictures or videos, photographed by the plurality of photographing devices 6, and splice the images into a 360° surround-view image around the entire first hinged structure segment 1. Thereby, the image processing device 8 performs processing such as distortion correction, perspective transformation and panoramic splicing fusion on the images photographed by the plurality of photographing devices to generate a surround-view image. In this way, a real-time image around an outer periphery of the first hinged structure segment 1 can be obtained. For example, the image processing devices 8 may be DSP or PLC controllers, or the like.

The human-computer interaction component 9 is configured to display the surround-view image spliced by the splicing of the image processing device 8, so that a driver can see the environment around the engineering machinery more clearly, and a basis is provided for controlling the travel and operation of the engineering machinery. For example, the human-computer interaction component 9 may be a display, a touch screen or the like.

In this embodiment, the plurality of photographing devices 6 are all mounted on the first hinged structure segment 1, so that when the other hinged structure segment swings relative to the first hinged structure segment 1 during traveling of the engineering machinery, the photographing devices 6 can clearly photograph a positional change of the other hinged structure segment(s) than the first hinged structure segment 1 and conditions outside the cab 12, making image splicing easier, which can optimize an image splicing effect, enable the surround-view image to reflect conditions around the vehicle body more clearly, and prevent the occurrence of a visual blind area. This can provide an operator with a more direct-viewing and clearer basis for judgment when the engineering machinery is in various complex operating conditions. Moreover, there is no need to install an angle sensor for detecting a relative swing angle between the hinged structure segments to achieve image splicing, so the panoramic surround-view system is simpler in structure and easy to implement.

If the plurality of photographing devices 6 are arranged around the entire vehicle body, a large swing of the photographing devices 6 can be involved at the time of a relative swing between adjacent hinged structure segments, resulting in a split effect of the images photographed by the plurality of photographing devices 6, so it needs to install an angle sensor for detecting a swing angle, to constantly correct stored vehicle models according to actual conditions, which is complex to implement. Moreover, the storage of the vehicle models at various angles is also in a larger amount, and is more complex and costly in the final implementation process. If the angle sensor is damaged, vehicle model switching and image splicing at the time of hinged joint cannot be accomplished. Even if other visual identification or other compensation algorithms are adopted, cameras themselves deviate along with the vehicle body such that a field of view around the vehicle photographed by the cameras is also displaced, so a panoramic view close to the reality cannot be obtained ultimately.

As shown in FIG. 1, the plurality of photographing devices 6 are all located on a same side of the same hinged frame 3 in a length direction of the hinged engineering machinery. For example, if the cab 12 is located on a front vehicle body, the plurality of photographing devices 6 are all located on a front side of the hinged frame 3. This configuration enables other hinged structure segment(s) than the first hinged structure segment 1 to be completely within the photographing range of the photographing devices 6, such that shielding is not liable to occur, and the panoramic image can more clearly reflect the environment around the first hinged structure segment 1, and the occurrence of a visual blind area is prevented.

Further, the at least two hinged structure segments further include: a second hinged structure segment 2 and a third hinged structure segment 2' connected to two sides of the first hinged structure segment 1, respectively, and the plurality of photographing devices 6 are all located between two hinged frames 3 connected to the first hinged structure segment 1. For a construction machinery including at least three hinged structure segments, this configuration enables other hinged structure segments than the first hinged structure segment 1 to be completely within the photographing range of the photographing devices 6, such that shielding is not liable to occur, and the panoramic image can more clearly reflect the environment around the first hinged structure segment 1, and the occurrence of a visual blind area is prevented.

In some embodiments, the plurality of photographing devices 6 are arranged at the top of the first hinged structure segment 1, and photographing surfaces of the photographing devices 6 face the outer side of the first hinged structure segment 1 and are obliquely downward. In this way, the photographing devices 6 can photograph both images of parts of the vehicle body and images around the cab. For example, in the case of fisheye cameras, a range of 190° can be photographed transversely and a range of 140° can be photographed longitudinally.

For different types of engineering machinery, the plurality of photographing devices 6 are arranged in different ways, which will be described below by examples.

In a first embodiment, if the length of the first hinged structure segment 1 is less than an effective identification range of a single photographing device 6, the plurality of photographing devices 6 include four photographing devices 6 arranged in a front part, in a rear part, at a left side and at a right side of the first hinged structure segment 1, respectively.

If the length of the first hinged structure segment 1 is relatively short, one photographing device 6 arranged on the left side and one photographing device arranged on the right side can clearly photograph images on both sides. This structure can minimize the number of photographing devices 6 used and simplify the structure and reduce the arrangement cost of the surround-view system while ensuring a clear and all-sided observation of the outside of the cab 12.

Figure 2:
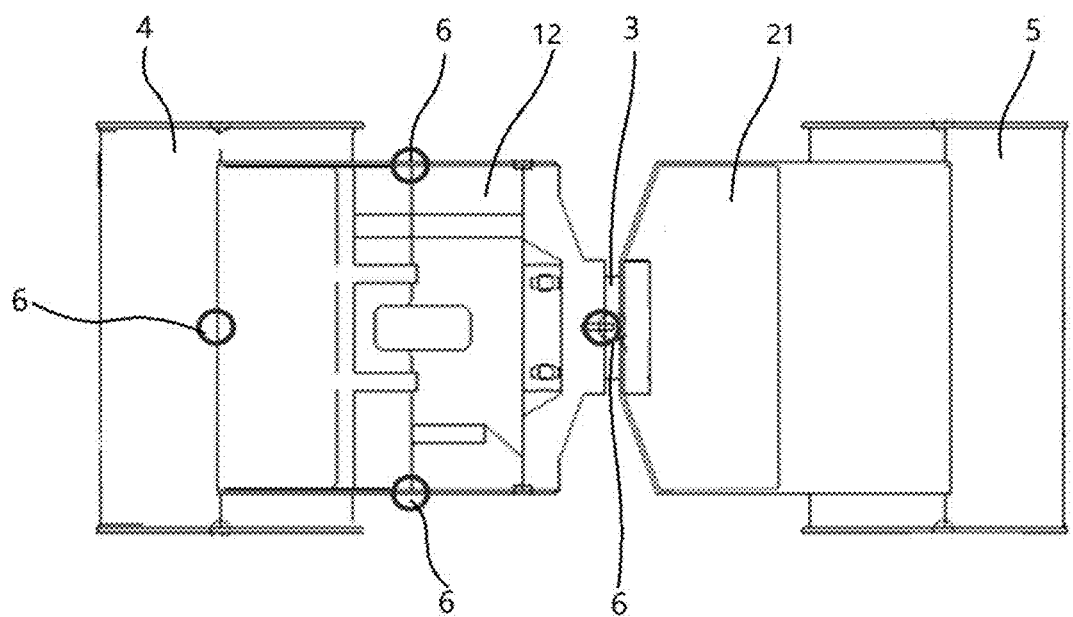
FIG. 2 is a top view of the first embodiment of the hinged engineering machinery of the present disclosure.

Using a road roller as an example, as shown in FIGS. 1 and 2, the first vehicle body 11 is one of a front vehicle body and a rear vehicle body, and the second hinged structure segment 2 includes a second vehicle body 21, the second vehicle body 21 being the other of the front vehicle body and the rear vehicle body. As shown in FIG. 1, a front wheel 4 is provided on a front side of the cab 12, and the front wheel 4 may be a steel wheel; and a rear wheel 5 is provided on a rear side of the second vehicle body 21, and the rear wheel 5 may be a steel wheel or a tire.

When the road roller is compacting a road along a roadside, a plurality of operators can clearly observe conditions on lateral sides of the vehicle body even from inside the cab, by means of the plurality of photographing devices 6 arranged on the first hinged structure segment 1, and the problem of missed compaction can be prevented.

In some embodiments, the plurality of photographing devices 6 are arranged around an outer periphery of the cab 12 or around an outer periphery of the first hinged structure segment 1.

If the length of the first vehicle body 11 is relatively small, as the cab 12 is relatively tall, a wider field of view can be obtained by arranging the plurality of photographing devices 6 around the outer periphery of the cab 12.

As shown in FIG. 2, four photographing devices 6 are arranged in a front part, in a rear part, at a left side and at a right side of the cab 12, respectively, to photograph images of environments in front of, behind, on the left side and on the right side of the cab 12, respectively. For example, the four photographing devices 6 may be arranged in middle positions of the front part, the rear part, the left side and the right side of the cab 12, respectively. This configuration enables conditions of the cab 12 in all directions to be clearly reflected in the surround-view image.

If the length of the first vehicle body 11 is relatively large, for example, the first vehicle body 11 being the rear vehicle body, with two tires being installed at the bottom of the rear vehicle body, after such engineering machinery is installed with the cab 12 on a side of the rear vehicle body close to the hinged frame 3, there is still a long distance left behind the rear side of the cab 12. If all the photographing devices 6 are arranged on the cab 12, a blind area formed due to the photographing device 6 at the rear side being shielded by the rear vehicle body is very large, and if the rear photographing device 6 is mounted to an end of the first vehicle body 11 away from the hinged frame 3, it can avoid the occurrence of a blind area due to being shielded by the vehicle body.

For such a structure, four photographing devices 6 are arranged on a side of the cab 12 close to the hinged frame 3, on a left side of the cab 12, on a right side of the cab 12 and on a side of the first vehicle body 11 away from the hinged frame 3, respectively.

Figure 5:
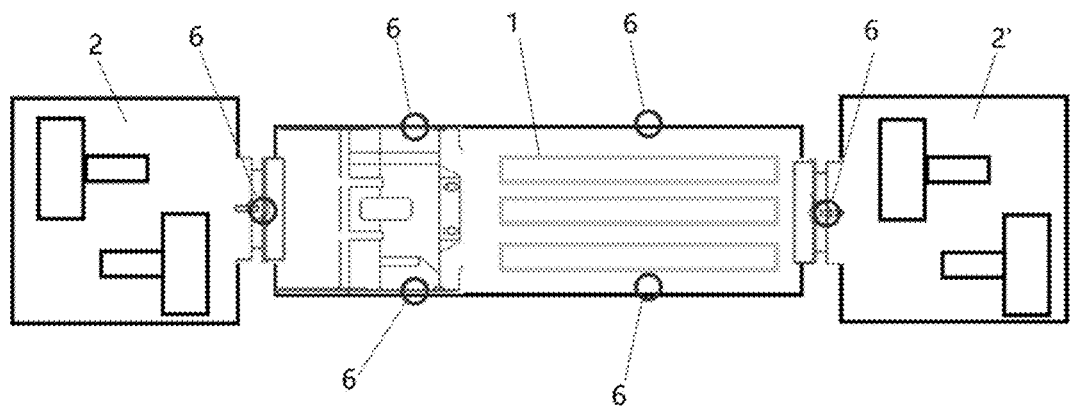
FIG. 5 is a top view of a second embodiment of the hinged engineering machinery of the present disclosure.
Figure 6A:
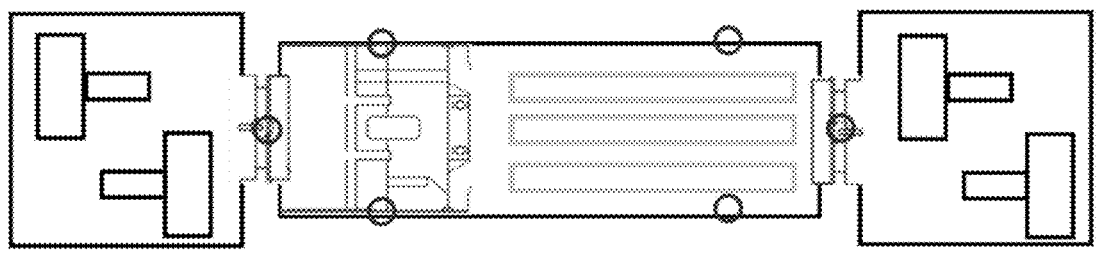
FIG. 6A illustrates an overall top-view model of the second embodiment shown in FIG. 5.
Figure 6B:
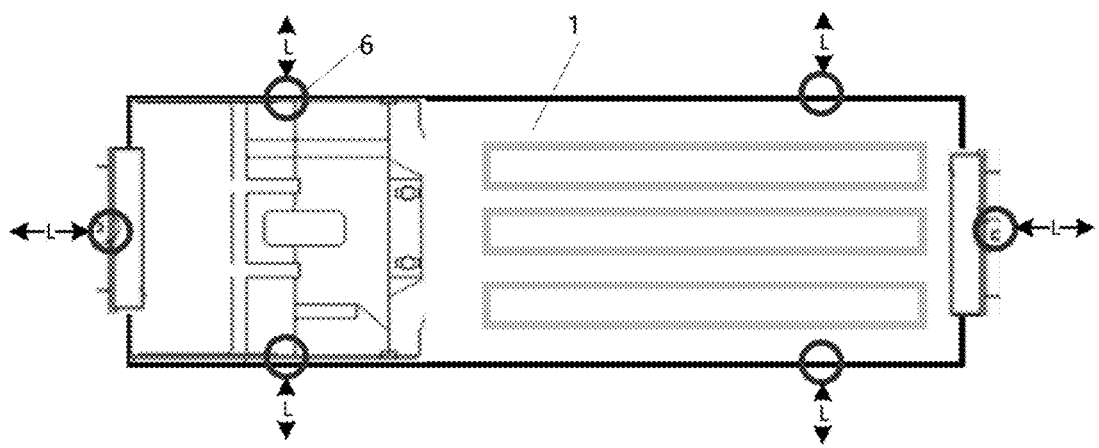
FIG. 6B illustrates only a model of a first hinged structure segment is retained in FIG. 6A.
Figure 6C:
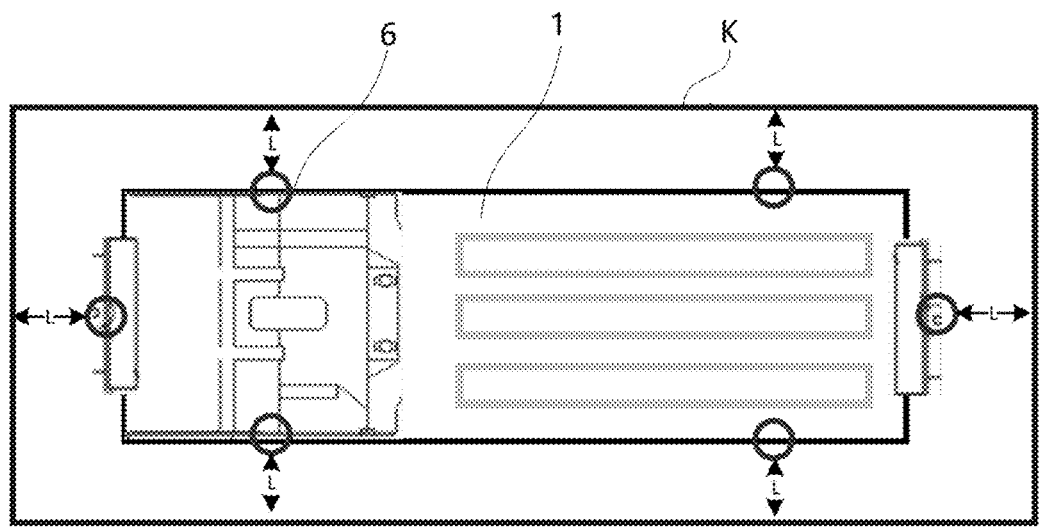
FIG. 6C is a schematic diagram of a preset reference boundary determined in the second embodiment.
Figure 6D:
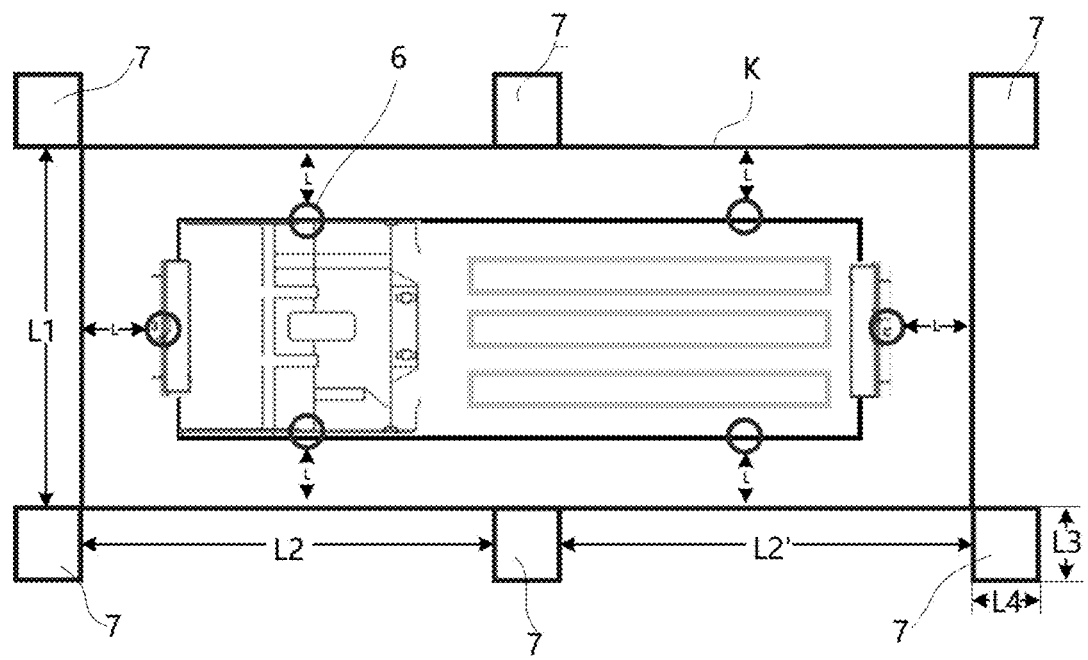
FIG. 6D is a schematic diagram of the second embodiment with six calibration devices arranged outside the preset reference boundary.

In a second embodiment, as shown in FIGS. 5 to 6D, if the length of the first hinged structure segment 1 is not less than an effective identification range of a single photographing device 6, the plurality of photographing devices 6 includes at least six photographing devices 6, one photographing device 6 being arranged in the front part and one photographing device being arranged in the rear part of the first hinged structure segment 1, and at least two photographing devices 6 being arranged spaced apart at the left side and at least two photographing devices 6 being also arranged spaced apart at the right side of the first hinged structure segment 1.

If the length of the first hinged structure segment 1 is relatively large, it is difficult to all-sidedly photograph conditions on lateral sides of the vehicle body if one photographing device 6 is arranged on the left side and one photographing device is arranged on the right side. In this embodiment, by arranging two photographing devices 6 on the left side and two photographing devices on the right side, the conditions on the lateral sides of the vehicle body can be photographed more clearly and all-sidedly, such that the surround-view image reflects conditions around the vehicle body more clearly, and the occurrence of a visual blind area is prevented.

Figure 8:
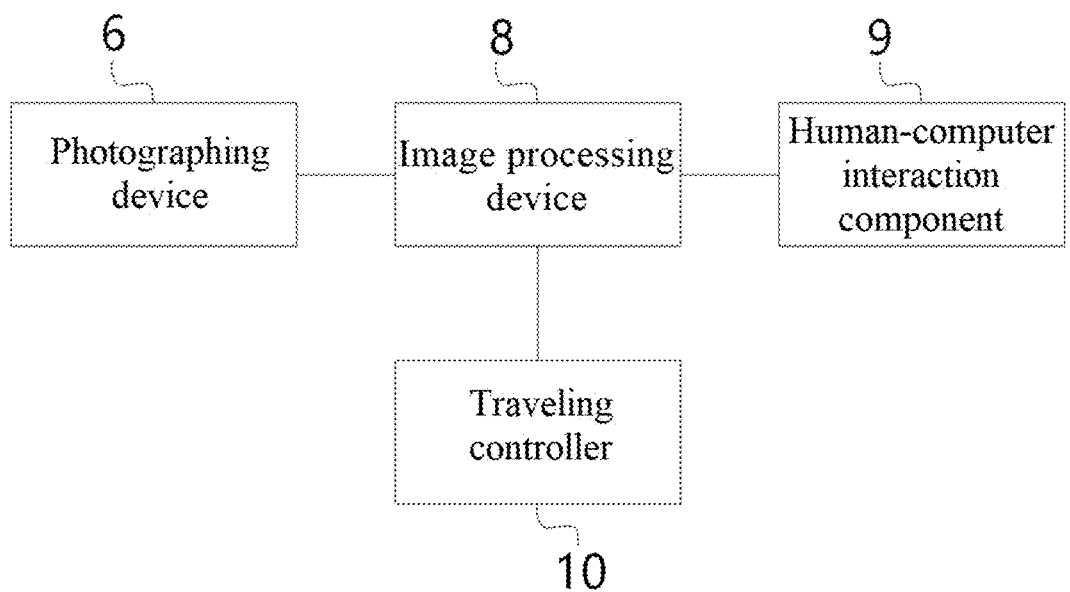
FIG. 8 is a schematic diagram of modular composition of some embodiments of a panoramic surround-view system of the hinged engineering machinery of the present disclosure.

In some embodiments, as shown in FIG. 8, the panoramic surround-view system may further include a traveling controller 10 electrically connected to the image processing device 8, and configured to control a traveling direction and a traveling speed of the hinged engineering machinery and transmit information of the traveling direction and the traveling speed to the image processing device 8. For example, the traveling controller 10 may be a DSP or PLC controller, or the like.

The image processing device 8 is configured to move up and down the surround-view image displayed in the human-computer interaction component 9, according to the traveling direction of the engineering machinery. The up and down movement here means up and down movement in a display area of the human-machine interaction component 9. When the traveling direction is forward, the surround-view image is moved down to increase a display range in front of the engineering machinery; when the traveling direction is backward, the surround-view image is moved up to increase a display range behind the engineering machinery; and how fast the surround-view image is moved and a position in the display area of the human-machine interaction component 9 where the image finally stops are determined according to the traveling speed, so that display changes of the surround-view image in the human-computer interaction component 9 follow a traveling process of the engineering machinery, and the display ranges meet the requirement of a safe braking distance range at the current speed. The running speed of the vehicle is in direct proportion to the final braking safety distance of the vehicle, and an area displayed in a screen is in direct proportion to an actual space in front of or behind the vehicle actually, i.e. the faster the speed, the more safety area should be displayed in the screen, e.g. linearly changing from 3 m to 10 m with the speed.

In this embodiment, a vehicle model can be more distributed in a direction opposite to the traveling direction, and an image in the traveling direction is presented more in the human-computer interaction component 9, so that the operator can observe environmental conditions ahead in the traveling direction of the engineering machinery in a larger range, so as to make a pre judgment in advance according to traveling conditions of the engineering machinery and take measures in advance in case of special conditions.

Moreover, since the spliced surround-view image itself is larger than the image displayed in the human-machine interaction component 9, when the picture as a whole is moved up and down, the pre-spliced image is just moved into the display area for display, instead of completely re-splicing a new image and displaying the re-spliced image, so an overall coordination degree of the screen is not be affected and the spliced image is not be deformed.

Based on the above embodiment, as described in FIGS. 3A to 7, the panoramic surround-view system further includes a plurality of calibration devices 7 arranged on a preset reference plane outside the first hinged structure segment 1, and arranged around the outer periphery of the cab 12 or the first hinged structure segment 1. Respective top surfaces of the plurality of calibration devices 7 are lower than mounting heights of the photographing devices 6 at corresponding positions, and thus the top surfaces of the calibration devices 7 are in mid-air above the reference plane and below the photographing devices 6. The plurality of calibration devices 7 are configured to calibrate photographed images before the plurality of photographing devices 6 are formally used. For example, the reference plane may be the ground, and may also be a platform.

For example, for a road roller, the heights of the calibration devices 7 can be close to the heights of the front wheels 4, so that the proportion of the vehicle body in the displayed image is appropriate. If the heights of the calibration devices 7 are too high, the proportion of the vehicle body in the displayed image is very small, such that obstacles around the vehicle cannot be observed in a clear and direct-viewing manner; and if the heights of the calibration devices are too low, the proportion of the vehicle body in the displayed image is very large, resulting in a very small visual area around the vehicle body, such that the safety distance requirement required for the system cannot be met.

In this embodiment, before formal use of the panoramic surround-view system, images photographed by the photographing devices 6 are calibrated first by the calibration devices 7, which enables the vehicle body and a surrounding scene to be adjusted to more appropriate proportions in the surround-view image so as to be closer to the real God's view, so that the displayed image seen by the driver is more real and conditions around the vehicle are easier to identify. In this embodiment, the top surfaces of the calibration devices 7 are at appropriate heights in the air, which enables the photographing devices 6 to obtain clearer and properly proportioned images, so that a screen ratio of the surround-view image is more coordinated. Moreover, when a person passes by a spliced part of the image, blind areas for human identification are reduced as much as possible.

For the first embodiment and the second embodiment mentioned above, the positions of the plurality of calibration devices 7 are also set differently, which will be described in detail below.

Figure 3A:
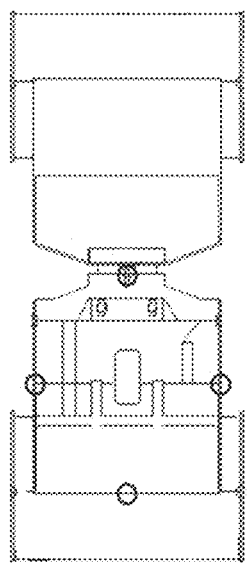
FIG. 3A illustrates an overall top-view model of the first embodiment shown in FIG. 1 and FIG. 2.
Figure 3B:
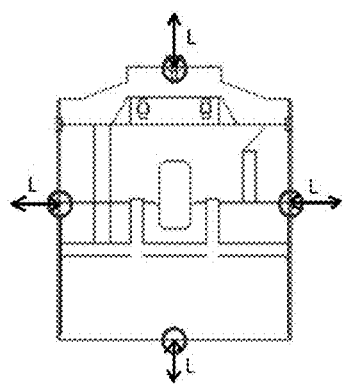
FIG. 3B illustrates only a model of a first hinged structure segment is retained in the overall top-view model of FIG. 3A.
Figure 3C:
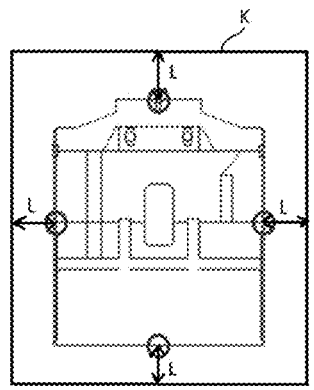
FIG. 3C is a schematic diagram of a preset reference boundary determined in the first embodiment.
Figure 3D:
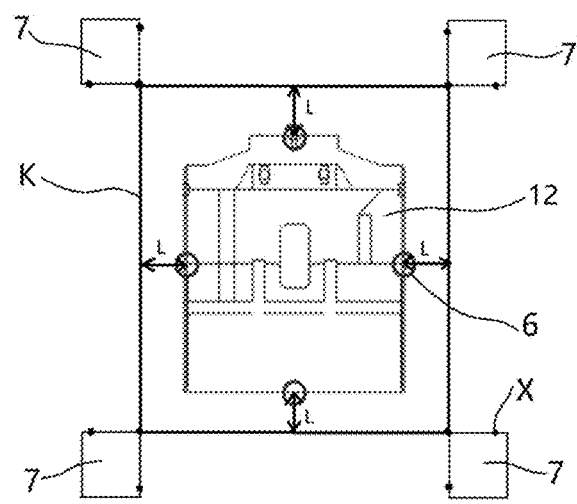
FIG. 3D is a schematic diagram of the first embodiment with calibration devices arranged at four corners outside the preset reference boundary.

For the first embodiment, as shown in FIGS. 3A to 3D, the four photographing devices 6 are all arranged on the cab 12, and four calibration devices 7 are arranged on a reference plane outside a preset reference boundary K, specifically by the following method:

1. as shown in FIG. 3A, an overall top-view model of the hinged engineering machinery is obtained;
2. as shown in FIG. 3B, in the overall top-view model, only a part of the model in an area where an outer contour of the cab 12 is located is retained, wherein the outer contour of the cab 12 refers to an actual outer edge of the cab 12;
3. as shown in FIG. 3C, an actual area corresponding to the part of the model is found in the actual vehicle body, and the reference boundary K is marked on the reference plane at a preset distance L deviated outward relative to the actual area, wherein the preset reference boundary K is a rectangle; and
4. as shown in FIG. 3D, as the length of the first hinged structure segment 1 is less than the effective identification range of a single photographing device 6, the four calibration devices 7 are arranged on the reference plane around the outside of the preset reference boundary K, and at four corners of the preset reference boundary K, respectively, such that projections of inner vertexes of feature identification objects of the calibration devices 7 on the reference plane coincide with the corners of the preset reference boundary K.

In the photographed images, the part of the model in the area where the outer contour of the cab 12 is located does not change much, and a real vehicle body part actually photographed by the photographing devices 6 is influenced by the heights of the calibration devices 7, because the calibration devices 7 are directly observed by the photographing devices 6.

Figure 4:
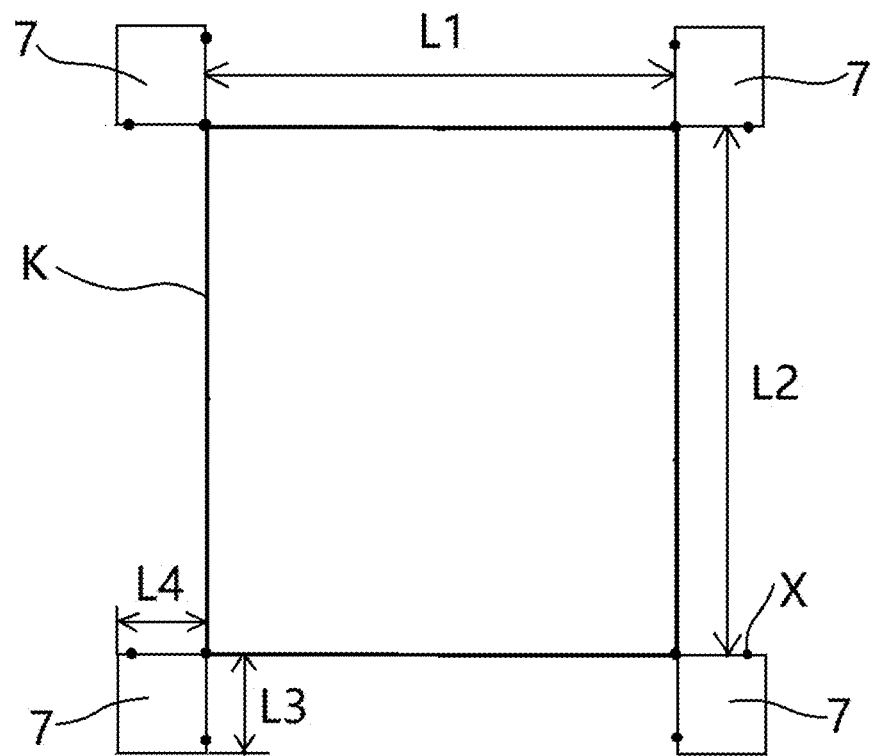
FIG. 4 is a schematic diagram of actual parameters of a plurality of calibration devices in the first embodiment.

In some embodiments, as shown in FIG. 4, the human-computer interaction component 9 is configured to receive from an operator a calibration instruction to move a calibration cursor X to feature identification objects in the calibration devices 7 and transmit the calibration instruction to the image processing device 8; and the image processing device 8 is configured to receive the calibration instruction and correct distortions in images photographed by the plurality of photographing devices 6 according to actual parameters of the plurality of calibration devices 7.

For some photographing devices 6 such as fisheye cameras, in order to photograph a larger range, objects in the images photographed in such a manner that near objects are larger and far objects are smaller are distorted, that is, some lines of the objects are changed from straight lines to curves. In this embodiment, the photographed images can be corrected by means of the feature identification objects in the calibration devices 7, so that a more real image is displayed in the human-computer interaction component 9 for observation by the operator.

In some embodiments, the actual parameters of the plurality of calibration devices 7 include a distance between two adjacent calibration devices 7 and outer contour dimensions of the feature identification object in a single calibration device 7, the feature identification object being configured for the operator to perform calibration in the human-computer interaction component 9 by means of the calibration cursor X.

For example, a calibration device 7 is arranged at each of four corners of the preset reference boundary K, and the outer contour of the feature identification object of the calibration device 7 is rectangular, and the actual parameters of the plurality of calibration devices 7 include: a distance L1 between a left and a right calibration device 7 at the front or rear, a distance L2 between a front and a rear calibration device 7 on the left or right side, a length dimension L3 of the feature identification object, and a width dimension L4 of the feature identification object.

The actual parameters are input by means of the human-computer interaction component 9 after placement of the calibration devices 7, and are adaptable to different vehicle models. The actual parameters of the plurality of calibration devices may be obtained by manual measurement, and may also be obtained by arranging visual identification components, for example by arranging cameras, focal lengths and mounting positions of the visual identification components and distances from the calibration devices 7 and the photographing devices 6 being known.

In some embodiments, the plurality of calibration devices 7 are arranged around the outside of the preset reference boundary K, and the calibration device 7 as a whole is located outside the preset reference boundary K, and projections of the feature identification objects of the calibration devices 7 on the reference plane fall partially on the preset reference boundary K, the preset reference boundary K being at a preset distance L deviated outward overall relative to an area where an outer contour of the cab 12 or the first hinged structure segment 1 is located. The preset distance L may be 1 m, and may also be set in conjunction with the needs of safety work. For example, the area where the outer contour of the cab 12 is located is a rectangular area. In conjunction with display of the human-computer interaction component 9, photographing angles of the plurality of photographing devices 6 are configured to be adjusted to be able to photograph the range from the vehicle body of the hinged engineering machinery to the preset reference boundary K.

In this embodiment, the photographing devices 6 can all-sidedly photograph the area between the vehicle body and the preset reference boundary K, thereby improving safety during traveling and operation of the engineering machinery. Moreover, the proportion of the vehicle body in the display screen can be appropriate.

In some embodiments, the plurality of calibration devices 7 are arranged outside the preset reference boundary K, the preset reference boundary K being at a preset distance L deviated outward overall relative to a rectangular area where an outer contour of the cab 12 or the first hinged structure segment 1 is located.

As shown in FIG. 3D, four calibration devices 7 are provided, which are arranged at four corners of the preset reference boundary K, respectively.

In some embodiments, the heights of the calibration devices 7 are adjustable. Through height adjustments of the height calibration devices 7, distortions on planes at heights where frameworks 74 in the calibration devices 7 are located can be minimized. If the calibration devices 7 are too close to the photographing devices 6, more scenes outside the vehicle body can be seen after calibration, but the proportion of the vehicle body in the displayed image is very small, such that obstacles around the vehicle body cannot be observed in a clear and direct-viewing manner; and if the calibration devices 7 are too far from the photographing devices 6, less scenes outside the vehicle body are seen after calibration, and the proportion of the vehicle body in the displayed image is very large, resulting in a very small visual area around the vehicle body, such that the safety distance requirement required for the system cannot be met. Thus, the calibration devices 7 are adjusted to appropriate heights, such that the proportions of the vehicle body and the environment outside the vehicle body in the image can be appropriate, and distortions on a plane where an area of interest of the vehicle body is located after calibration are minimized.

In some embodiments, the human-computer interaction component 9 is configured to receive externally input image revision parameters of at least some photographing devices 6 of the plurality of photographing devices 6, so as to ensure the surround-view image is at the same height. Whereby the operator can implement calibration and key parameter setting of the photographing devices 6.

Since it is difficult for the photographing devices 6 to be completely at the same mounting heights, by observing the surround-view image, the depth of image display can be changed by the operator inputting the image revision parameters for photographing devices 6 with unmatched image heights, so that joint and transition between adjacent images are smooth and the surround-view image is at the same height to optimize image quality.

For the second embodiment, the arrangement of the plurality of calibration devices 7 differs from that in the first embodiment in that six calibration devices 7 are arranged on a reference plane outside a preset reference boundary K, specifically by the following method:
1. as shown in FIG. 6A, an overall top-view model of the hinged engineering machinery is obtained;
2. as shown in FIG. 6B, in the overall top-view model, only a part of the model in an area where an outer contour of the first hinged structure segment 1 is located is retained, wherein the outer contour of the first hinged structure segment 1 refers to an actual outer edge of the first hinged structure segment 1;
3. as shown in FIG. 6C, an actual area corresponding to the part of the model is found in the actual vehicle body, and the reference boundary K is marked on the reference plane at a preset distance L deviated outward relative to the actual area, wherein the preset reference boundary K is a rectangle; and
4. as shown in FIG. 6D, if the length of the first hinged structure segment 1 is not less than the effective identification range of a single photographing device 6, the calibration devices 7 are arranged at four corners of the preset reference boundary K and at positions on left and right sides thereof located between two adjacent photographing devices 6, respectively.

Specifically, the six calibration devices 7 are arranged, on the reference plane, around the outside of the preset reference boundary K. Four of the calibration devices 7 are arranged at the four corners of the preset reference boundary K, respectively, and projections of inner vertexes of feature identification objects of the calibration devices 7 on the reference plane coincide with the corners of the preset reference boundary K; and the other two calibration devices 7 are located on the left and right sides of the preset reference boundary K, respectively, and each calibration device 7 is located between two adjacent photographing devices 6 on the same side in the length direction of the engineering machinery, e.g. may be located at a middle position on the side of the preset reference boundary K in the length direction.

The outer contour of the feature identification object of the calibration device 7 is rectangular, and the actual parameters of the plurality of calibration devices 7 include: a distance L1 between a left and a right calibration device 7 at the front or rear, a distance L2 between a front and a middle calibration device 7 and a distance L2' between a middle and a rear calibration device 7 on the left or right side, a length dimension L3 of the feature identification object, and a width dimension L4 of the feature identification object. Except for this, reference can be made to the first embodiment for the rest of the second embodiment.

Figure 7:
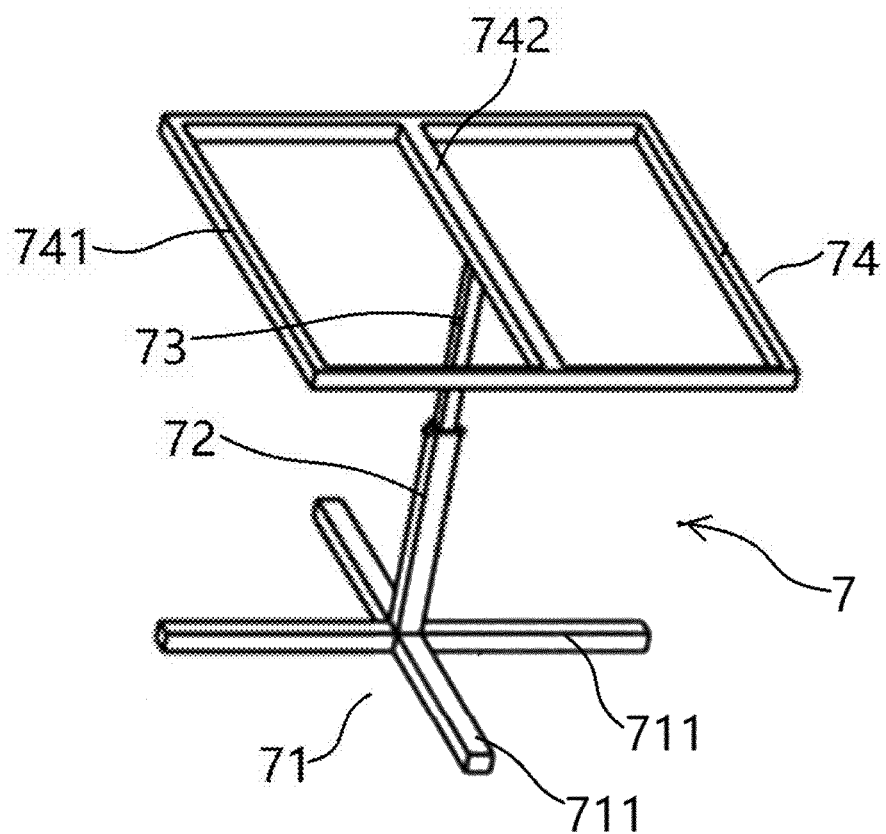
FIG. 7 is a schematic structural diagram of some embodiments of a calibration device.

In some embodiments, as shown in frame FIG. 7, the calibration device 7 includes a base 71, a first support frame 72, a second support frame 73 and a framework. A first end of the first support frame 72 is fixed to the base 71; the second support frame 73 is located above the first support frame 72, and a first end of the second support frame 73 is connected to a second end of the first support frame 72 and the height of the second support frame is adjustable; and the framework 74 is connected to a second end of the second support frame 73, and the framework 74 serves as a feature identification object when an operator performs calibration in the human-computer interaction component 9. For example, the framework 74 may be a rectangular framework.

Specifically, as shown in FIG. 7, the base 71 includes two cross beams 711 arranged in a cross intersecting manner; the first support frame 72 is an upright rod, and the first end of the upright rod is connected to a point of intersection of the two cross beams 711; the second support frame 73 is also an upright rod, and the first end of the second support frame 73 can be inserted into the second end of the first support frame 72 or sleeved outside the second end of the first support frame 72, and its height is adjustable; and the framework 74 includes a rectangular frame formed by enclosure of four beams 741, with a reinforcing beam 742 being connected between two opposite beams 741 and located at a middle position of the beams 741 in a length direction, and the second end of the second support frame 73 is connected to the reinforcing beam 742.

The framework 74 has a known size, and as the feature identification object, facilitates the operator calibrating the photographing device 6 by moving the marker cursor X onto an outer frame of the framework 74. Further, the size of the base 71 is larger than that of the framework 74, so that the calibration device 7 can be prevented from tipping over during calibration, and the safety and efficiency of calibration are improved.

Furthermore, the present disclosure also provides hinged engineering machinery including: at least two hinged structure segments connected sequentially by means of a hinged frame 3, and a panoramic surround-view system of the hinged engineering machinery of the above embodiment. The at least two hinged segments include a first hinged structure segment 1, the first hinged structure segment 1 including a first vehicle body 11 and a cab 12 arranged on the first vehicle body 11.

In some embodiments, the at least two hinged segments include a first hinged structure segment 1 and a second hinged structure segment 2, and the second hinged structure segment 2 may be connected to a front part or a rear part of the first hinged structure segment 1 by means of the hinged frame 3.

In other embodiments, the at least two hinged segments include a first hinged structure segment 1, a second hinged structure segment 2, and a third hinged structure segment 2', the second hinged structure segment 2 and the third hinged structure segment 2' being connected to a front end and a rear end of the first hinged structure segment 1, respectively.

Furthermore, the present disclosure also provides a calibration method based on the panoramic surround-view system of the hinged engineering machinery of the above embodiment. In some embodiments, the method includes:

step 101: in conjunction with display of the human-computer interaction component 9, adjusting photographing angles of the plurality of photographing devices 6 to be able to photograph the range from the vehicle body of the hinged engineering machinery to the preset reference boundary K, the preset reference boundary K being at a preset distance L deviated outward overall relative to an area where an outer contour of the cab 12 or the first hinged structure segment 1 is located, the preset reference boundary K being rectangular for example;

step 102: arranging the plurality of calibration devices 7, on the reference plane, around the outside of the preset reference boundary K, wherein if the calibration devices 7 are arranged at corners of the preset reference boundary K, projections of inner vertexes of feature identification objects of the calibration devices 7 on the reference plane may coincide with the corners of the preset reference boundary K; and if the calibration devices 7 are arranged at sides of the preset reference boundary K, projections of inner vertexes of feature identification objects of the calibration devices 7 on the reference plane may coincide with the sides of the preset reference boundary K; and step 103: moving the calibration cursor X in the human-computer interaction component 9 to the feature identification objects of the calibration devices 7 to calibrate photographed images before the plurality of photograph components 6 are formally used.

Steps 101-103 may be performed sequentially. In this embodiment, by adjusting the photographing angles of the plurality of photographing devices 6 and calibrating the photographed images, the photographing devices 6 can all-sidedly photograph the area between the vehicle body and the preset reference boundary K, thereby improving safety during traveling and operation of the engineering machinery. Moreover, it enables the vehicle body and a surrounding scene to be adjusted to more appropriate proportions in the surround-view image so as to be closer to the real God's view, so that the displayed image seen by the driver is more real and conditions around the vehicle are easier to identify.

In some embodiments, the calibration method of the present disclosure further includes:
step 104: after the surround-view image is formed by splicing, according to height matching degrees of partial images of the surround-view image, setting image revision parameters of at least some photographing devices 6 of the plurality of photographing devices 6 by means of the human-computer interaction component 9, to ensure the surround-view image is at the same height.

Step 104 may be performed after step 103. Since it is difficult for the photographing devices 6 to be completely at the same mounting heights, by observing the surround-view image, for photographing devices 6 with unmatched image heights, the image heights can be changed by the operator inputting the image revision parameters, so that joint and transition between adjacent images are smooth and the surround-view image is at the same height to optimize image quality.

In some embodiments, arranging the plurality of calibration devices 7, on the reference plane, around the outside of the preset reference boundary K in step 102 includes:
step 102A: obtaining an overall top-view model of the hinged engineering machinery, as shown in FIG. 3A;

step 102B: in the overall top-view model, only retaining a part of the model in the area where the outer contour of the cab 12 or the first hinged structure segment 1 is located; wherein if the plurality of photographing devices 6 are all arranged on the cab 1, only a part of the model in the area where the outer contour of the cab 12 is located is retained; and if the plurality of photographing devices 6 are arranged on both the cab 1 and the first vehicle body 11, a part of the model in the area where the snidely outer contour of the first hinged structure segment 1 is located is retained;

step 102C: finding, in the actual vehicle body, an actual area corresponding to the part of the model, and marking the reference boundary K on the reference plane at a preset distance L deviated outward overall relative to the actual area, for example marking the reference boundary K on the ground or on a platform; and step 102D: arranging, on the reference plane, the plurality of calibration devices 7 around the outside of the preset reference boundary K, wherein the feature identification objects of the calibration devices 7 as a whole are located outside the preset reference boundary K, and their projections on the reference plane fall partially on the preset reference boundary K; for example, vertexes or inner edges of the feature identification objects may fall on the preset reference boundary K.

In some embodiments, arranging the plurality of calibration devices 7, on the reference plane, around the outside of the preset reference boundary K in step 102 includes:
arranging four calibration devices 7, at four corners of the preset reference boundary K, respectively.

In some embodiments, before calibrating the photographed images in step 103, the calibration method of the present disclosure further includes:
step 105: inputting actual parameters of the plurality of calibration devices 7 by means of the human-computer interaction component 9, for use in correcting, by the image processing device 8, distortions in the images photographed by the plurality of photographing devices 6 to achieve calibration,
wherein the actual parameters of the plurality of calibration devices 7 include a distance between two adjacent calibration devices 7 and outer contour dimensions of the feature identification object in a single calibration device 7, the feature identification object being configured for the operator to perform calibration in the human-computer interaction component 9.

In this embodiment, by inputting the actual parameters of the plurality of calibration devices 7, in the actual photographed images, distortions of the actual images can be corrected based on the actual parameters, with the feature identification objects of the calibration devices 7 as targets, so that the human-computer interaction component 9 presents a more real visual scene to facilitate observation by the operator and improve safety during traveling and operation of the engineering machinery.

In some embodiments, after arranging the plurality of calibration devices 7, on the reference plane, outside the preset reference boundary K in step 102, and before step 103, the calibration method of the present disclosure further includes:
step 106: adjusting the heights of the plurality of calibration devices 7 to adjust the proportion of the vehicle body of the hinged engineering machinery in the surround-view image after calibration. For example, the heights of the calibration devices 7 can be automatically adjusted.

Through height adjustments of the height calibration devices 7, distortions on planes at heights where the calibration devices 7 are located can be minimized. If the calibration devices 7 are too close to the photographing devices 6, more scenes outside the vehicle body can be seen after calibration; and if the calibration devices 7 are too far from the photographing devices 6, less scenes outside the vehicle body are seen after calibration. Thus, the calibration devices 7 are adjusted to appropriate heights, such that the proportions of the vehicle body and the environment outside the vehicle body in the image can be appropriate.

In some embodiments, the plurality of photographing devices 6 include four photographing devices 6, one photographing component 6 being arranged in the front part and one photographing component being arranged in the rear part of the first hinged structure segment 1, at least one photographing component 6 being arranged at the left side and at least one photographing component being arranged at the right side of the first hinged structure segment 1, one calibration device 7 being arranged at each of four corners of the preset reference boundary K, respectively.

Based on this arrangement, in some embodiments, if the at least two hinged structure segments further include a second hinged structure segment 2, the first hinged structure segment 1 being connected to the second hinged structure segment 2 and located at a rearmost end, adjusting the heights of the plurality of calibration devices 7 in step 106 includes:
- step 106A: adjusting the heights of the calibration devices 7 at left front and right front positions to a height with a height difference from the second hinged structure segment 2 not exceeding a first preset height, i.e. to a height close to that of the second hinged structure segment and lower than a mounting height of the photographing component 6 in the front part; and
- step 106B: adjusting the heights of the calibration devices 7 at left rear and right rear positions to a height lower than a mounting height of the photographing component 6 in the rear part, with a height difference from the calibration devices 7 at the left front and right front positions not exceeding a second preset height.

In some other embodiments, if the at least two hinged structure segments further include a second hinged structure segment 2, the first hinged structure segment 1 being connected to the second hinged structure segment 2 and located at a foremost end, adjusting the heights of the plurality of calibration devices 7 in step 106 includes:
- step 106C: adjusting the heights of the calibration devices 7 at left rear and right rear positions to a height with a height difference from the second hinged structure segment 2 not exceeding a third preset height, and lower than a mounting height of the photographing component 6 in the rear part; and
- step 106D: adjusting the heights of the calibration devices 7 at left front and right front positions to a height lower than a mounting height of the photographing component 6 in the front part, with a height difference from the calibration devices 7 at the left rear and right rear positions not exceeding a fourth preset height.

In some further embodiments, if the at least two hinged structure segments further include a second hinged structure segment 2 and a third hinged structure segment 2' connected to a front side and a rear side of the first hinged structure segment 1, respectively, adjusting the heights of the plurality of calibration devices 7 in step 106 includes:
- step 106E: adjusting the heights of the calibration devices 7 at left front and right front positions to a height close to the second hinged structure segment 2, and lower than a mounting height of the photographing component 6 in the front part; and
- step 106F: adjusting the heights of the calibration devices 7 at left rear and right rear positions to a height close to the third hinged structure segment 2', and lower than a mounting height of the photographing component 6 in the rear part.

In this embodiment, the photographing devices 6 close to the hinged frames 3 can clearly and all-sidedly photograph the vehicle body structure and the proportions of the entire vehicle body in the photographed images are appropriate. If the calibration devices 7 is too close to the photographing devices 6, the proportion of the vehicle body in the displayed image is very small, such that obstacles around the vehicle cannot be observed in a clear and direct-viewing manner; and if the calibration devices 7 are too far from the photographing devices 6, the proportion of the vehicle body in the displayed image is very large, resulting in a very small visual area around the vehicle body, such that the safety distance requirement required for the system cannot be met. Thus, the calibration devices 7 are adjusted to appropriate heights, such that the proportions of the vehicle body and the environment outside the vehicle body in the image can be appropriate, and distortions on a plane where an area of interest of the vehicle body is located after calibration are minimized.

In some embodiments, at least two photographing devices 6 are arranged spaced apart at the left side and at least two photographing devices are arranged spaced apart at the right side of the first hinged structure segment 1, and at least one calibration device 7 is arranged at a left middle position and at least one calibration device is arranged at a right middle position of the preset reference boundary K, the calibration device 7 being located between two adjacent photographing devices 6 on the same side, for example the calibration device 7 being located at a middle position on the side in the length direction. After adjusting the calibration devices 7 at the four corners of the preset reference boundary K, adjusting the heights of the plurality of calibration devices 7 in step 106 further includes:
- step 106G: adjusting the height of the calibration device 7 at the left middle position to a height between the heights of the calibration devices 7 at the four corners, and lower than mounting heights of the at least two photographing devices 6 at the left side; and
- step 106H: adjusting the height of the calibration device 7 at the right middle position to a height between the heights of the calibration devices 7 at the four corners, and lower than mounting heights of the at least two photographing devices 6 at the right side.

In the above embodiment of the present disclosure, original images around the vehicle are collected by means of the photographing devices 6 mounted on the cab of the engineering machinery; the operator performs calibration by means of the human-computer interaction component 9 in combination with the calibration devices 7; the image processing device obtains a complete surround-view image of the vehicle according to calibration information; the photographing devices 6 are all mounted on the hinged segment where the cab 12 is located; by using the tailor-made calibration devices 7, the heights of the feature identification objects from the ground can be adjusted according to needs of the vehicle, such that the hinged frame 3 and the vehicle structure will be transformed into a bird's eye view and presented in the surround-view image, finally achieving the God's view of the panoramic system of the hinged engineering machinery without dead angle; and a surround-view area displayed in the human-computer interaction component 9 is controlled to move up and down according to traveling direction and traveling speed information provided by the traveling controller 10.

The embodiments provided in the present disclosure are described above in detail. Specific embodiments are used herein to illustrate the principles and implementations of the present disclosure, and the description of the above embodiments are only used to help understand the method of the present disclosure and its core idea. It should be noted that to those of ordinary skill in the art, a number of improvements and modifications may also be made for the present disclosure without departing from the principles of the present disclosure, and these improvements and modifications also fall within the protection scope of the claims of present disclosure.

The invention claimed is:

1. A panoramic surround-view system of a hinged engineering machinery, wherein the hinged engineering machinery comprises at least two hinged structure segments sequentially connected by means of a hinged frame, the at least two hinged structure segments comprising a first hinged structure segment, and the first hinged structure segment comprising a first vehicle body and a cab arranged on the first vehicle body, the panoramic surround-view system comprising:
   a plurality of photographing devices, mounted on the first hinged structure segment and configured to photograph the environment around the hinged engineering machinery;
   an image processing device, configured to receive images photographed by the plurality of photographing devices and form the images into a surround-view image around the entire first hinged structure segment;
   a human-computer interaction component, configured to display the surround-view image formed by the image processing device; and
   a plurality of calibration devices, arranged on a preset reference plane outside the first hinged structure segment and arranged around the outer periphery of the cab or the first hinged structure segment, respective top surfaces of the plurality of calibration devices being lower than mounting heights of the photographing devices at corresponding positions, and the plurality of calibration devices being configured to calibrate photographed images before the plurality of photographing devices are used.

2. The panoramic surround-view system of the hinged engineering machinery according to claim 1, wherein the plurality of photographing devices are all located on a same side of the same hinged frame in a length direction of the hinged engineering machinery.

3. The panoramic surround-view system of the hinged engineering machinery according to claim 2, wherein the at least two hinged structure segments further comprise a second hinged structure segment and a third hinged structure segment connected to two sides of the first hinged structure segment, respectively, and the plurality of photographing devices are all located between two hinged frames connected to the first hinged structure segment.

4. The panoramic surround-view system of the hinged engineering machinery according to claim 1, wherein the plurality of photographing devices are arranged around an outer periphery of the cab or around an outer periphery of the first hinged structure segment.

5. The panoramic surround-view system of the hinged engineering machinery according to claim 1, wherein
   if a length of the first hinged structure segment is less than an effective identification range of a single photographing component, the plurality of photographing devices comprise four photographing devices arranged in a front part, in a rear part, at a left side and at a right side of the first hinged structure segment, respectively; and/or
   if a length of the first hinged structure segment is not less than the effective identification range of a single photographing component, the plurality of photographing devices comprise at least six photographing devices, one photographing component being arranged in the front part and one photographing component being arranged in the rear part of the first hinged structure segment, and at least two photographing devices being arranged spaced apart at the left side and at least two photographing devices being arranged spaced apart at the right side of the first hinged structure segment.

6. The panoramic surround-view system of the hinged engineering machinery according to claim 1, wherein the plurality of photographing devices are arranged at the top of the first hinged structure segment, and photographing surfaces of the photographing devices face the outer side of the first hinged structure segment and are obliquely downward.

7. The panoramic surround-view system of the hinged engineering machinery according to claim 1, further comprising:
   a traveling controller, electrically connected to the image processing device, and configured to control a traveling direction and a traveling speed of the hinged engineering machinery, and transmit information of the traveling direction and the traveling speed to the image processing device,
   wherein the image processing device is configured to move up and down the surround-view image displayed in the human-computer interaction component, according to the traveling direction, in such a manner of moving the surround-view image down when the traveling direction is forward, and moving the surround-view image up when the traveling direction is backward, and to determine how fast the surround-view image is moved and a position where the image finally stops, according to the traveling speed.

8. The panoramic surround-view system of the hinged engineering machinery according to claim 1, wherein the human-computer interaction component is configured to receive from an operator a calibration instruction to move a calibration cursor to feature identification objects in the calibration devices, and transmit the calibration instruction to the image processing device; and the image processing device is configured to receive the calibration instruction, and correct distortions in images photographed by the plurality of photographing devices according to actual parameters of the plurality of calibration devices.

9. The panoramic surround-view system of the hinged engineering machinery according to claim 8, wherein the actual parameters of the plurality of calibration devices comprise a distance between two adjacent calibration devices and outer contour dimensions of the feature identification object in a single calibration device, the feature identification object being configured for the operator to perform calibration in the human-computer interaction component by means of the calibration cursor.

10. The panoramic surround-view system of the hinged engineering machinery according to claim 1, wherein the plurality of calibration devices are arranged outside a preset reference boundary, the preset reference boundary being at a preset distance deviated outward overall relative to a rectangular area formed by an outer contour of the cab or the first hinged structure segment; and in conjunction with display of the human-computer interaction component, photographing angles of the plurality of photographing devices are configured to be adjusted to be able to photograph the range from the vehicle body of the hinged engineering machinery to the preset reference boundary.

11. The panoramic surround-view system of the hinged engineering machinery according to claim 1, wherein the plurality of calibration devices are arranged outside a preset reference boundary, the preset reference boundary being at a preset distance deviated outward overall relative to an area where an outer contour of the cab is located; and if a length of the first hinged structure segment is less than the effective identification range of a single photographing component, the plurality of calibration devices are arranged at four corners of the preset reference boundary, respectively; or if a length of the first hinged structure segment is not less than the effective identification range of a single photographing component, the calibration devices are arranged at four corners of the preset reference boundary and at positions on left and right sides thereof located between two adjacent photographing devices, respectively.

12. The panoramic surround-view system of the hinged engineering machinery according to claim 1, wherein the heights of the calibration devices are adjustable.

13. The panoramic surround-view system of the hinged engineering machinery according to claim 1, wherein the human-computer interaction component is configured to receive externally input image revision parameters of at least some photographing devices of the plurality of photographing devices to ensure that the surround-view image is at the same height.

14. The panoramic surround-view system of the hinged engineering machinery according to claim 1, wherein the calibration device comprises:
  a base;
  a first support frame, a first end thereof being fixed to the base;
  a second support frame, located above the first support frame, a first end of the second support frame being connected to a second end of the first support frame and the height of the second support frame being adjustable; and
  a framework, connected to a second end of the second support frame, the framework serving as a feature identification object when an operator performs calibration in the human-computer interaction component.

15. The hinged engineering machinery, comprising: at least two hinged structure segments connected in sequence by a hinged frame, and the panoramic surround-view system of the hinged engineering machinery of claim 1,
  wherein the at least two hinged structure segments comprise a first hinged structure segment, the first hinged structure segment comprising a first vehicle body and a cab arranged on the first vehicle body.

16. A calibration method based on the panoramic surround-view system of the hinged engineering machinery according to claim 1, comprising:
  in conjunction with display of the human-computer interaction component, adjusting photographing angles of the plurality of photographing devices to be able to photograph the range from the vehicle body of the hinged engineering machinery to a preset reference boundary, the preset reference boundary being at a preset distance deviated outward overall relative to an area where an outer contour of the cab or the first hinged structure segment is located;
  arranging the plurality of calibration devices on a reference plane around the outside of the preset reference boundary; and
  moving a calibration cursor in the human-computer interaction component to feature identification object of the calibration devices to calibrate photographed images before the plurality of photograph components are formally used.

17. The calibration method according to claim 16, further comprising:
  after the surround-view image is formed by splicing, according to height matching degrees of partial images of the surround-view image, setting image revision parameters of at least some photographing devices of the plurality of photographing devices by means of the human-computer interaction component, to ensure that the surround-view image is at the same height.

18. The calibration method according to claim 17, wherein arranging the plurality of calibration devices on the reference plane outside the preset reference boundary comprises:
  obtaining an overall top-view model of the hinged engineering machinery;
  in the overall top-view model, only retaining a part of the model in the area where the outer contour of the cab or the first hinged structure segment is located;
  finding, in the actual vehicle body, an actual area corresponding to the part of the model, and marking the reference boundary on the reference plane at a preset distance deviated outward relative to the actual area; and
  arranging, on the reference plane, the plurality of calibration devices around the outside of the preset reference boundary.

19. The calibration method according to claim 17, wherein before calibrating the photographed images, the calibration method further comprises:
  inputting actual parameters of the plurality of calibration devices by means of the human-computer interaction component, so as to correct, by the image processing device, distortions in the images photographed by the plurality of photographing devices to achieve calibration, wherein the actual parameters of the plurality of calibration devices comprise a distance between two adjacent calibration devices and outer contour dimensions of the feature identification object in a single calibration device, the feature identification object being configured for the operator to perform calibration in the human-computer interaction component.

20. The calibration method according to claim 17, wherein after arranging the plurality of calibration devices on the reference plane outside the preset reference boundary, the calibration method further comprises:
  adjusting the heights of the plurality of calibration devices, so as to adjust a proportion of the vehicle body of the hinged engineering machinery in the surround-view image after calibration.

21. The calibration method according to claim 20, wherein the plurality of photographing devices comprise at least four photographing devices, one photographing component being arranged in the front part and one photographing device being arranged in the rear part of the first hinged structure segment, at least one photographing device being arranged at the left side and at least one photographing device being arranged at the right side of the first hinged structure segment, one calibration device being arranged at each of four corners of the preset reference boundary, respectively, wherein the at least two hinged structure segments further comprise a second hinged structure segment, the first hinged structure segment being connected to the second hinged structure segment and located at a rearmost end, and adjusting the heights of the plurality of calibration devices comprises:

adjusting the heights of the calibration devices at left front and right front positions to a height close to that of the second hinged structure segment, and lower than a mounting height of the photographing device in the front part; and adjusting the heights of the calibration devices at left rear and right rear positions to a height lower than a mounting height of the photographing device in the rear part, and with a height difference from the calibration devices at the left front and right front positions not exceeding a preset height; or the at least two hinged structure segments further comprise a second hinged structure segment, the first hinged structure segment being connected to the second hinged structure segment and located at a foremost end, and adjusting the heights of the plurality of calibration devices comprises:

adjusting the heights of the calibration devices at left rear and right rear positions to a height close to the second hinged structure segment, and lower than a mounting height of the photographing device in the rear part; and adjusting the heights of the calibration devices at left front and right front positions to a height lower than a mounting height of the photographing device in the front part, and with a height difference from the calibration devices at the left rear and right rear positions not exceeding a preset height; or the at least two hinged structure segments further comprise a second hinged structure segment and a third hinged structure segment connected to a front side and a rear side of the first hinged structure segment, respectively, and adjusting the heights of the plurality of calibration devices comprises:

adjusting the heights of the calibration devices at left front and right front positions to a height close to the second hinged structure segment, and lower than a mounting height of the photographing device in the front part; and adjusting the heights of the calibration devices at left rear and right rear positions to a height close to the third hinged structure segment, and lower than a mounting height of the photographing device in the rear part.

22. The calibration method according to claim 21, wherein at least two photographing devices are arranged spaced apart at the left side and at least two photographing devices are arranged spaced apart at the right side of the first hinged structure segment, and at least one calibration device is arranged at a left middle position and at least one calibration device is arranged at a right middle position of the preset reference boundary, the calibration device being located between two adjacent photographing devices on the same side, and after adjusting the calibration devices at the four corners of the preset reference boundary, adjusting the heights of the plurality of calibration devices further comprises:

adjusting the height of the calibration device at the left middle position to a height between the heights of the calibration devices at the four corners, and lower than mounting heights of the at least two photographing devices at the left side; and adjusting the height of the calibration device at the right middle position to a height between the heights of the calibration devices at the four corners, and lower than mounting heights of the at least two photographing devices at the right side.

\* \* \* \* \*